US009810952B2

(12) United States Patent
Kuramoto

(10) Patent No.: US 9,810,952 B2
(45) Date of Patent: *Nov. 7, 2017

(54) LIQUID CRYSTAL DISPLAY DEVICE

(71) Applicant: Japan Display Inc., Tokyo (JP)

(72) Inventor: Yuki Kuramoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,846

(22) Filed: May 18, 2016

(65) Prior Publication Data

US 2016/0259189 A1   Sep. 8, 2016

Related U.S. Application Data

(63) Continuation of application No. 14/452,684, filed on Aug. 6, 2014, now Pat. No. 9,372,365.

(30) Foreign Application Priority Data

Aug. 20, 2013   (JP) .................................. 2013-170266

(51) Int. Cl.
*G02F 1/1339*   (2006.01)
*G02F 1/1335*   (2006.01)
*G02F 1/1337*   (2006.01)
*G02F 1/1333*   (2006.01)

(52) U.S. Cl.
CPC ........ *G02F 1/1339* (2013.01); *G02F 1/13394* (2013.01); *G02F 1/133512* (2013.01); *G02F 1/133514* (2013.01); *G02F 1/1337* (2013.01); *G02F 1/13378* (2013.01); *G02F 2001/133388* (2013.01); *G02F 2001/133519* (2013.01)

(58) Field of Classification Search
CPC ............. G02F 1/1339; G02F 1/133514; G02F 1/133512; G02F 1/13394
See application file for complete search history.

(56) References Cited

U.S. PATENT DOCUMENTS

| 7,446,826 B2* | 11/2008 | Ro ...................... G02F 1/13394 349/153 |
| 8,687,163 B2 | 4/2014 | Sasaki |
| 9,372,365 B2* | 6/2016 | Kuramoto ............. G02F 1/1339 |
| 2012/0033162 A1* | 2/2012 | Ahn ...................... G02F 1/1339 349/106 |
| 2015/0029432 A1 | 1/2015 | Ishikawa et al. |

FOREIGN PATENT DOCUMENTS

| JP | 2007-304452 A | 11/2007 |
| JP | 2011-022535 A | 2/2011 |

* cited by examiner

*Primary Examiner* — Dung Nguyen
(74) *Attorney, Agent, or Firm* — Typha IP LLC

(57) ABSTRACT

A liquid crystal display device is provided in which color unevenness can be reduced and inhibited in the peripheral display area even when the display device has a narrow frame. In the liquid crystal display device, liquid crystal sandwiched between a TFT substrate and a CF substrate and sealed by a seal is disposed in a frame portion. The CF substrate has a BM, a color resist film, an OC, an alignment film, and a wall that inhibits the alignment film from expanding outward. In the area where the wall is disposed, the BM and color resist film on the CF substrate are removed.

6 Claims, 14 Drawing Sheets

F I G . 1 1 T
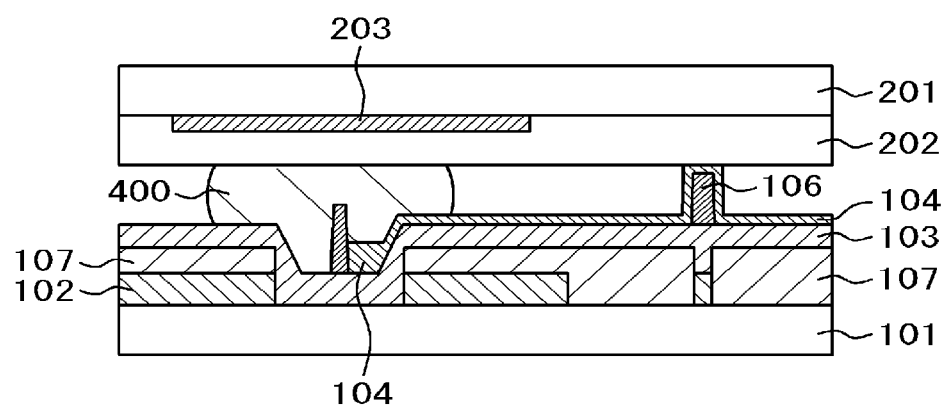

LIQUID CRYSTAL DISPLAY DEVICE

CROSS-REFERENCE TO RELATED APPLICATIONS

This application is a continuation of U.S. patent application Ser. No. 14/452,684, filed on Aug. 6, 2014. Further, this application claims priority from Japanese patent application JP 2013-170266 filed on Aug. 20, 2013 the entire contents of which are hereby incorporated by reference into this application.

FIELD OF THE INVENTION

The present invention relates to a liquid crystal display device having a narrow frame.

BACKGROUND ART OF THE INVENTION

In liquid crystal display devices, a TFT substrate in which pixels having pixel electrodes and thin-film transistors (TFT) are formed in the matrix and a counter substrate (CF substrate) facing the TFT substrate and having a color filter etc. formed correspondingly to the pixel electrodes of the TFT substrate are disposed. A sealant that seals a liquid crystal composition is provided around the substrates. An alignment film and the sealant are provided near to one another to meet a request for making a periphery portion (frame) small relative to a display area, which is the so-called narrowing of a frame. The liquid crystal display device in which an alignment film is formed even in the sealant area is disclosed in JP-A No. 2007-304452, for example.

SUMMARY OF THE INVENTION

In the periphery portion (frame) relative to the display area, the inventors have prototyped and examined a liquid crystal display device having a wall to inhibit an alignment film from expanding beyond a predetermined position. The wall placed in the frame has been formed at the time when a columnar spacer (placed in the available display area) is formed to adjust the distance between the TFT substrate and CF substrate. No abnormality has been seen in characteristics of a liquid crystal display device having a large frame in particular. Color unevenness has been seen in the peripheral display area of a liquid crystal display device having a narrow frame.

An object of the present invention is to provide a liquid crystal display device in which color unevenness in the peripheral display area can be reduced and inhibited even when the display device has a narrow frame.

As one embodiment for addressing the above object, a liquid crystal display device having an available display area and a frame portion that surrounds the available display area has the following characteristics. A first substrate, a second substrate, and liquid crystal sandwiched between the first substrate and the second substrate and sealed by a seal are placed in the frame portion. The second substrate has: a film stack in which a black matrix (BM), a color filter (color resist film), and an overcoat (OC) are stacked sequentially; an alignment film placed to the overcoat on the liquid crystal side; and a wall that inhibits the alignment film from expanding outwardly toward the available display area. The seal is disposed over the wall. At least any one of the black matrix, color resist film, and Overcoat is removed partially in the area where the wall is disposed. The distance from the wall in the partial removal portion to the first substrate is larger than the distance from the wall provided other than the partial removal portion to the first substrate.

According to the present invention, it may be possible to provide a liquid crystal display device in which color unevenness in the peripheral display area can be reduced and inhibited even when the display device has a narrow frame.

BRIEF DESCRIPTION OF THE DRAWINGS

FIG. 11T is a schematic cross sectional view for explaining the manufacturing process of the liquid crystal display device of the second embodiment of the present invention (the seal has expanded and the process has completed).

PREFERRED EMBODIMENTS OF THE INVENTION

Figure 1:
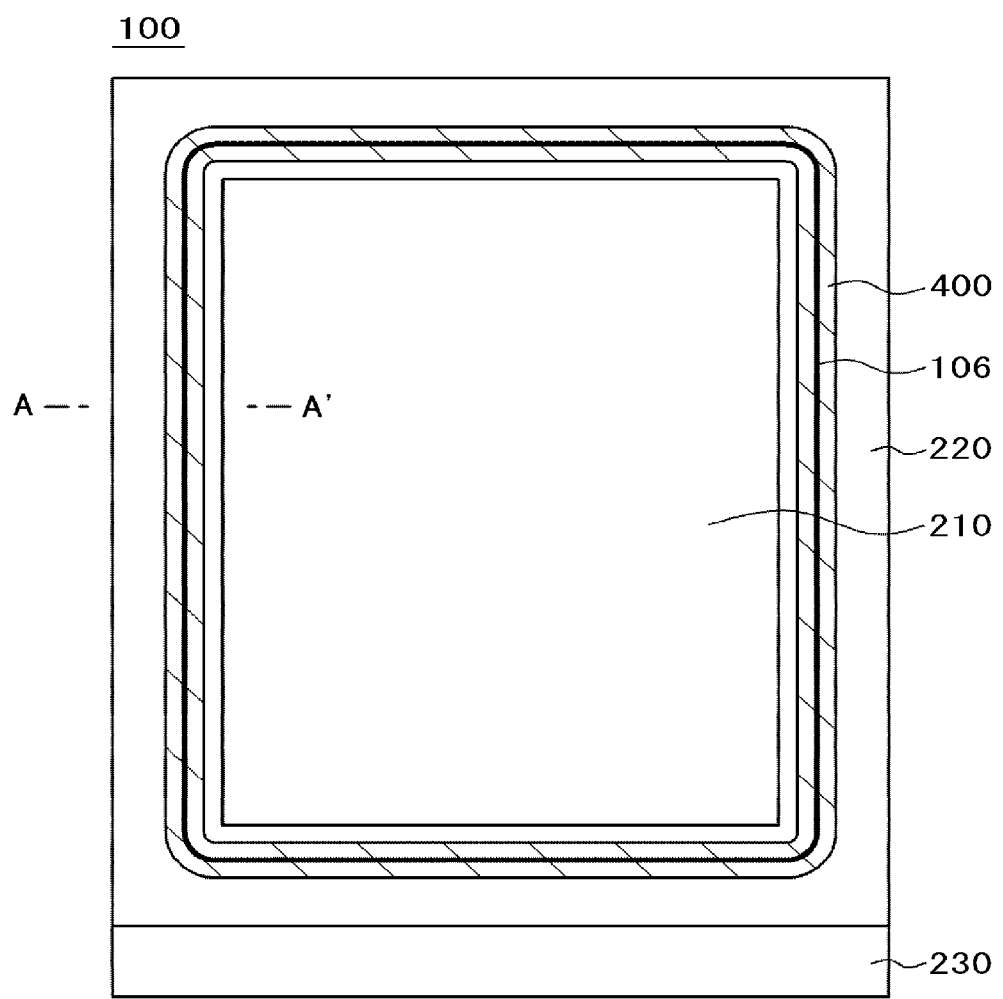
FIG. 1 is a schematic plan view of a liquid crystal display device which the inventors have examined and which relates to each embodiment of the present invention.
Figure 2:
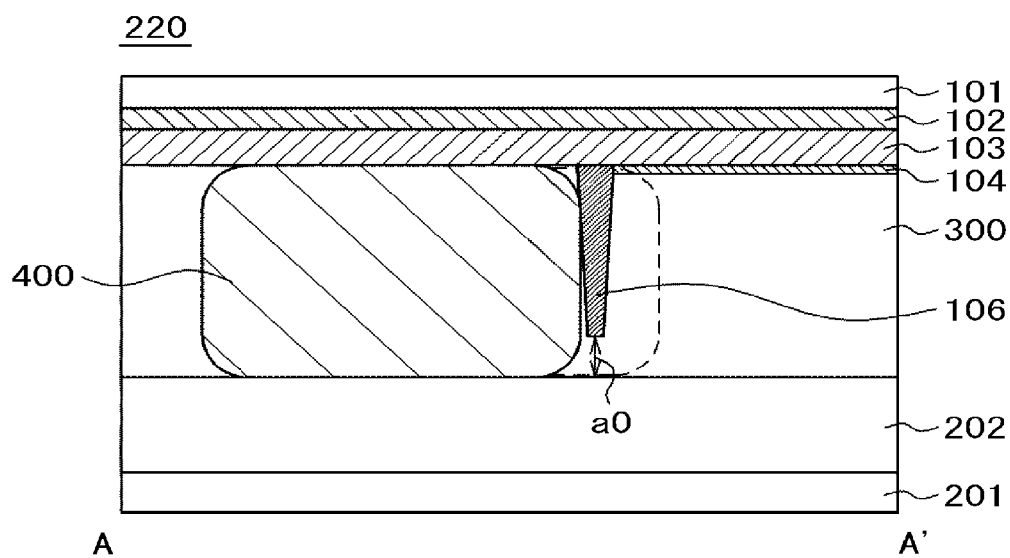
FIG. 2 is a schematic cross sectional view of a frame portion in the liquid crystal display device the inventors have examined.
Figure 3:
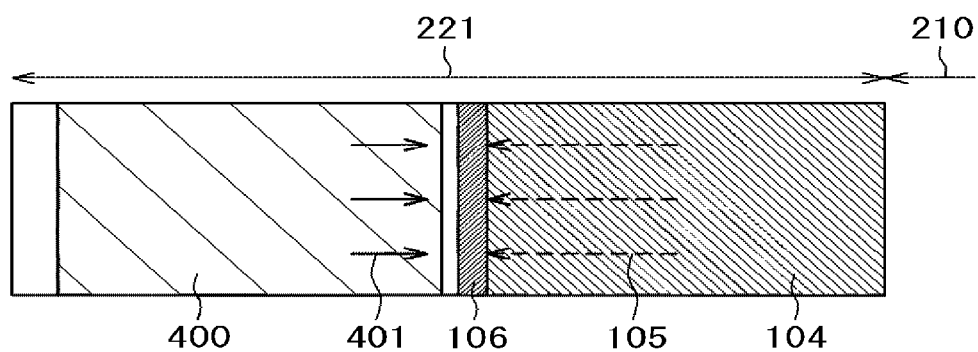
FIG. 3 is a plan view of a frame portion in the liquid crystal display device (the frame is wide) the inventors have examined to explain the flows of an alignment film and sealant.
Figure 4:
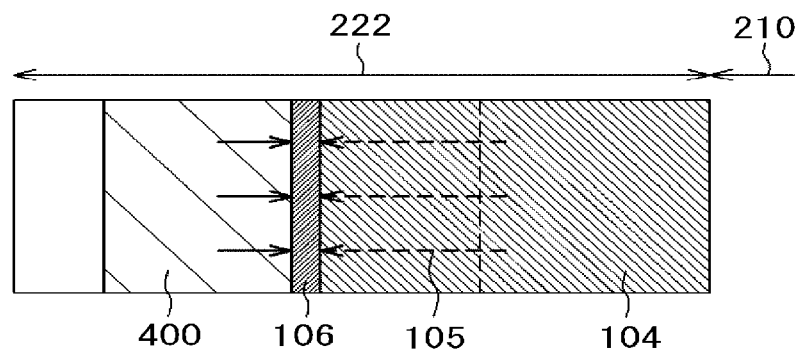
FIG. 4 is a plan view of a frame portion in the liquid crystal display device (the frame is narrow) the inventors have examined to explain flows of an alignment film and sealant.

The present inventors have investigated the cause of color unevenness in the peripheral display area of a liquid crystal display device having a narrow frame. FIG. 1 shows a schematic plan view of a liquid crystal display device 100 the inventors have examined. An available display area 210 is arranged in the central portion, the periphery of which is a frame 220 to form a wall 106 that blocks an alignment film and a seal 400. Reference numeral 230 denotes a terminal portion. FIG. 2 shows a schematic cross sectional view taken along Line A-A' (frame portion) of FIG. 1. A TFT substrate and a CF substrate (counter substrate) are joined together. The TFT substrate includes a glass substrate 201 and a film stack (TFT film) 202 having an organic insulating film, an inorganic insulating film, metal wiring, a semiconductor layer, etc. The CF substrate has a glass substrate 101, a black matrix (BM) 102, an overcoat (OO) 103, a wall 106 that blocks an alignment film, and an alignment film 104. Between the TFT substrate and the CF substrate, liquid crystal 300 and a seal 400 that seals the liquid crystal is formed. The dashed line in FIG. 2 schematically shows the top end (the end toward the available display area) of the seal when the frame is narrow. Sign a0 shows a space between the wall 106 and TFT substrate. FIG. 3 and FIG. 4 show plan views near Line A-A' (frame portion) of FIG. 1. Reference numeral 210 shows the available display area. Reference numeral 221 denotes a wide frame. Reference numeral 222 denotes a narrow frame. FIG. 3 shows a case where the frame is wide, and the alignment film 104 expands in arrow 105 and is stopped by the wall 106. By being inserted between the TFT substrate and the CF substrate, the seal 400 expands in arrow 401 and stops short of the wall 106. On the other hand, FIG. 4 shows a case where the frame is narrow, in which the alignment film 104 expands in arrow 105 and stops by the wall 106, but it is difficult for the seal 400 to get over the wall 106 and to enter the area on the opposite side of the wall (only up to the dashed line portion at best). That is, the seal 400 is stopped by the wall 106, and thus cannot be fully expanded (collapsed). Especially, the gap between the TFT substrate and the CF substrate expands in the sealing area to be over a predetermined value. This has been found to cause color shift. The present invention has been produced by this knowledge. While stopping the alignment film, the space (a0 shown in FIG. 2) between the wall 106 and the TFT substrate is increased to ensure the way of the seal. Hereafter, the present invention is explained using embodiments. The same reference numerals show the same components in Figures.

First Embodiment

Figure 5A:
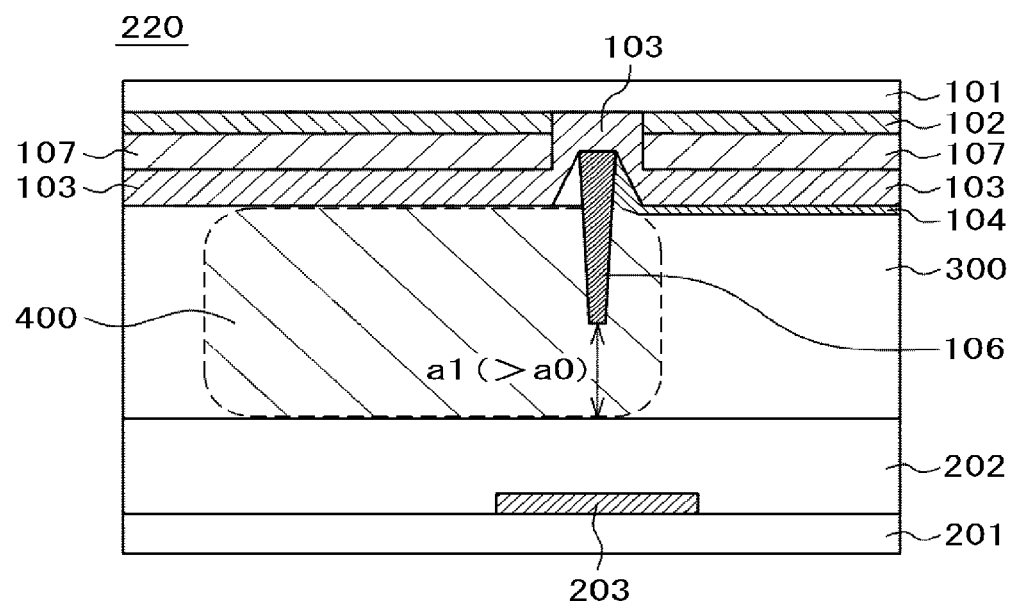
FIG. 5A is a schematic cross sectional view of the frame portion in the liquid crystal display device of the first embodiment of the present invention.
Figure 5B:
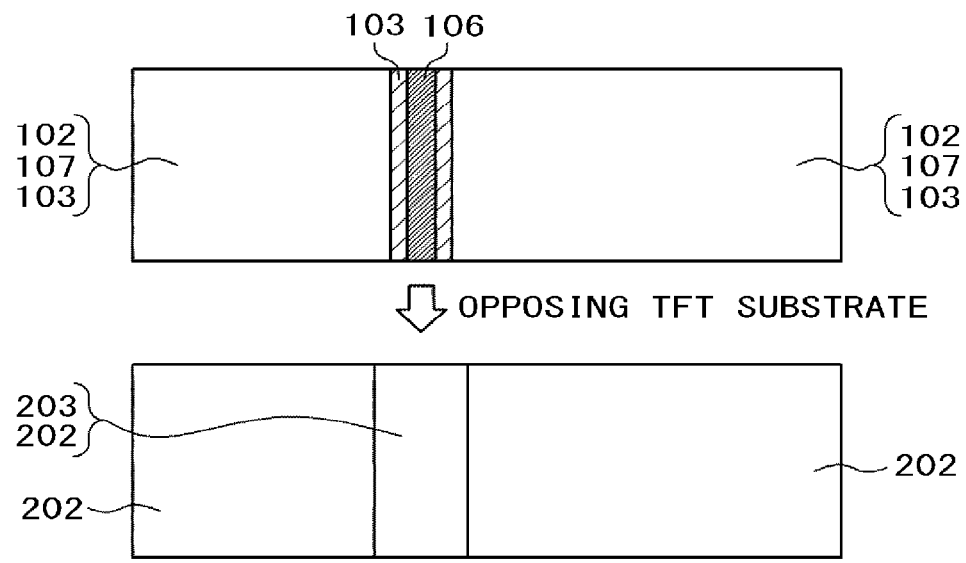
FIG. 5B is a schematic plan view of the liquid crystal display device of the first embodiment of the present invention, in which the upper portion is a CF substrate and the lower portion is a TFT substrate.

The first embodiment of the present invention is described using FIG. 5A FIG. 5B, and FIGS. 11A to 11T. FIG. 5A is a schematic cross sectional view of the frame portion in a liquid crystal display device of this embodiment. FIG. 5B is a schematic plan view of the liquid crystal display device of this embodiment, in which the upper portion is a CF substrate, and the lower portion is a TFT substrate.

In this embodiment, to make a distance a1 between the wall 106 that stops the expansion of the alignment film 104 and the topmost surface of the TFT substrate larger than a distance a0 shown in FIG. 2, the black matrix (BM) 102 and a color resist film (color filter) 107 on the CF substrate are removed in the area where the wall 106 is formed. As a result, the distance a1 is ensured wider than the distance a0 by the total thickness of the BM 102 and color resist film 107. As a result, the seal 400 expands over the wall 106 easily, and variation of the distance between the TFT substrate and the CF substrate can be reduced. As a result, color unevenness in the peripheral display area can be inhibited. The alignment film 104 is stopped by the wall 106 and inhibited from expanding. As a result, the reliability life can be ensured. Additionally, since the BM 102 and color resist film 107 are processed and then used in the available display area, these films in the wall portion of the frame can be removed without increasing the process number. However, in this embodiment, since the BM 102 is removed, light dropout may occur. As a countermeasure against the light dropout, a light shielding metal film 203 may be disposed to the TFT substrate. As in other embodiments, when films on the CF substrate, such as the black matrix and color resist film, are removed in the wall portion, thicknesses of the films are reduced to achieve some advantageous effect without removing the film completely. Further, by removing the films on the CF substrate, such as the black matrix and color resist film in the wall portion, moisture can be blocked from entering from the outside through the films.

Figure 11A:
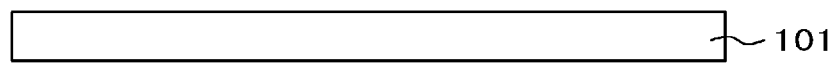
FIG. 11A is a schematic cross sectional view for explaining the manufacturing process of the liquid crystal display device of the second embodiment of the present invention (preparation of a glass substrate)
Figure 11B:
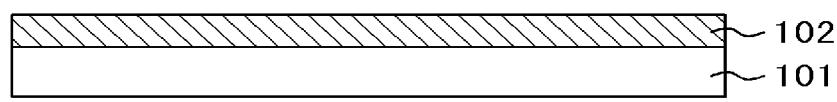
FIG. 11B is a schematic cross sectional view for explaining the manufacturing process of the liquid crystal display device of the second embodiment of the present invention (application of a black matrix)
Figure 11C:
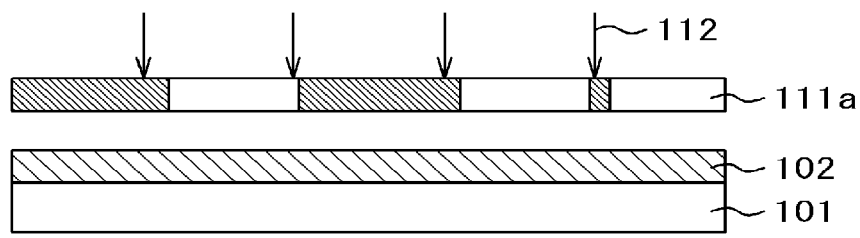
FIG. 11C is a schematic cross sectional view for explaining the manufacturing process of the liquid crystal display device of the second embodiment of the present invention (UV radiation using a photomask for the black matrix)
Figure 11D:
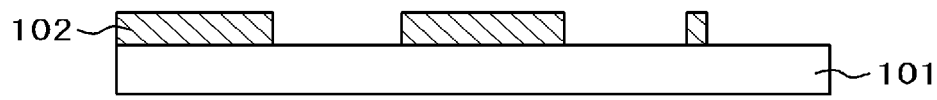
FIG. 11D is a schematic cross sectional view for explaining the manufacturing process of the liquid crystal display device of the second embodiment of the present invention (removal of an excessive black matrix)

Next, a method of manufacturing the liquid crystal display device shown in this embodiment is explained using FIGS. 11A to 11T. First, the glass substrate 101 is prepared to form the black matrix, color resist, wall, etc. (FIG. 11A). In the explanatory view, the right-hand side from the center shows the available display area, and the left-hand side from the center shows the frame. Next, a black matrix for light shielding is applied to form the BM 102 of 1.5 μm in thickness (FIG. 11B). Next, an ultraviolet (UV) radiation 112 is applied using a photomask 111a for the black matrix (FIG. 11C). Then, the excessive black matrix is removed to form the BM 102 having a desired pattern (FIG. 11D). In this case, not only the black-matrix in the available display area but also the black matrix in the wall area of the frame is removed. The width of this area is 50 μm.

Figure 11E:
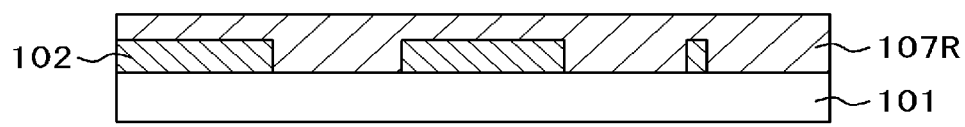
FIG. 11E is a schematic cross sectional view for explaining the manufacturing process of the liquid crystal display device of the second embodiment of the present invention (application of a color resist (red R))
Figure 11F:
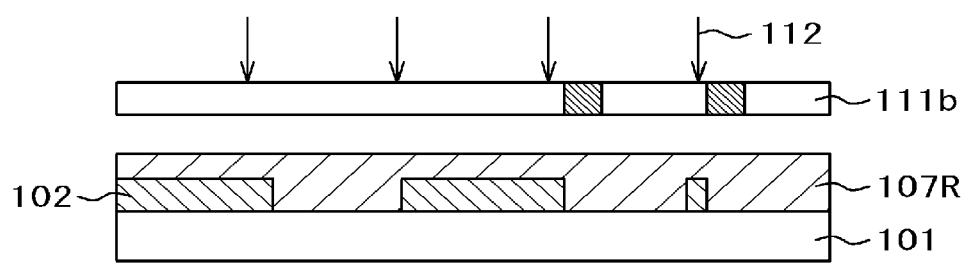
FIG. 11F is a schematic cross sectional view for explaining the manufacturing process of the liquid crystal display device of the second embodiment of the present invention (UV radiation using a photomask for the red resist)
Figure 11G:
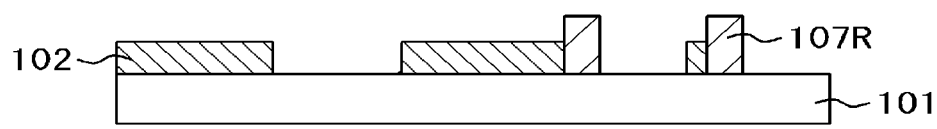
FIG. 11G is a schematic cross sectional view for explaining the manufacturing process of the liquid crystal display device of the second embodiment of the present invention (removal of an unnecessary color resist)

Next, a color resist (for example, red R) is applied to form a color resist film 107R of 2 μm (FIG. 11E). Subsequently, the UV radiation 112 is applied using a photomask 111b for the red resist (FIG. 11F). Then, the excessive red resist film is removed to form the red resist film 107R having a desired pattern (FIG. 11G).

Figure 11H:
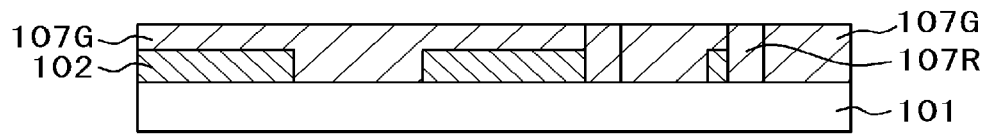
FIG. 11H is a schematic cross sectional view for explaining the manufacturing process of the liquid crystal display device of the second embodiment of the present invention (application of a color resist (green G))
Figure 11I:
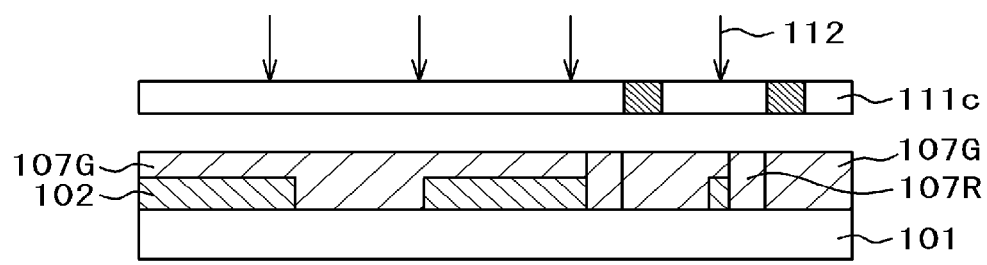
FIG. 11I is a schematic cross sectional view for explaining the manufacturing process of the liquid crystal display device of the second embodiment of the present invention (UV radiation using a photomask for the green resist)
Figure 11J:
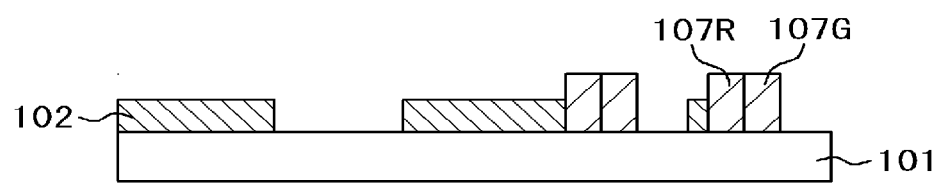
FIG. 11J is a schematic cross sectional view for explaining the manufacturing process of the liquid crystal display device of the second embodiment of the present invention (removal of unnecessary color resist)

Next, a green resist is applied to form a color resist film 107G of 2 μm (FIG. 11H). Subsequently, the UV radiation 112 is applied using a photomask 111c for the green resist (FIG. 11I). Then, the excessive green resist film is removed to form the green resist film 107G having a desired pattern (FIG. 11J).

Figure 11K:
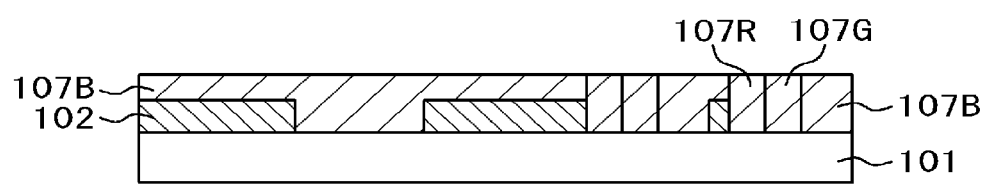
FIG. 11K is a schematic cross sectional view for explaining the manufacturing process of the liquid crystal display device of the second embodiment of the present invention (application of a color resist (blue B))
Figure 11L:
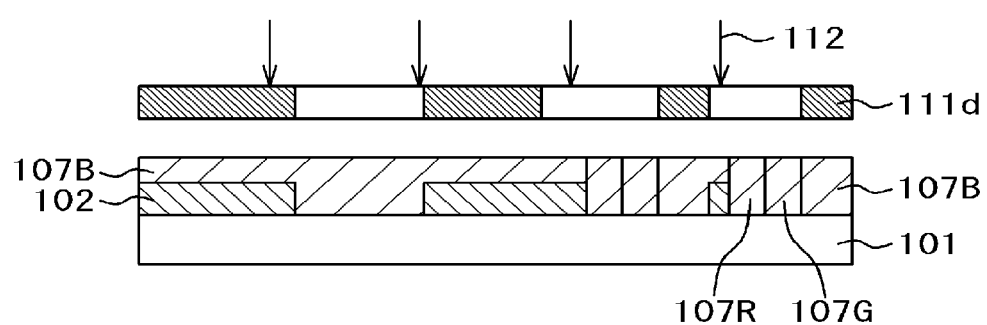
FIG. 11L is a schematic cross sectional view for explaining the manufacturing process of the liquid crystal display device of the second embodiment of the present invention (UV radiation using a photomask for the blue resist)
Figure 11M:
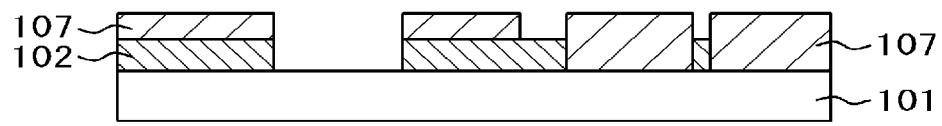
FIG. 11M is a schematic cross sectional view for explaining the manufacturing process of the liquid crystal display device of the second embodiment of the present invention (removal of unnecessary color resist)

Next, a blue resist is applied to form a color resist film 107B of 2 μm (FIG. 11K). Subsequently, the UV radiation 112 is applied using a photomask 111d for the blue resist (FIG. 11L). Then, the excessive blue resist film is removed to form the blue resist film 107B having a desired pattern (FIG. 11M). In this case, not only the blue resist film in the available display area but also the blue resist film in the wall area of the frame is removed.

Figure 11N:
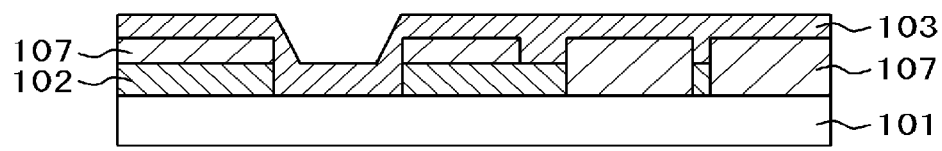
FIG. 11N is a schematic cross sectional view for explaining the manufacturing process of the liquid crystal display device of the second embodiment of the present invention (application of an Overcoat)
Figure 11O:
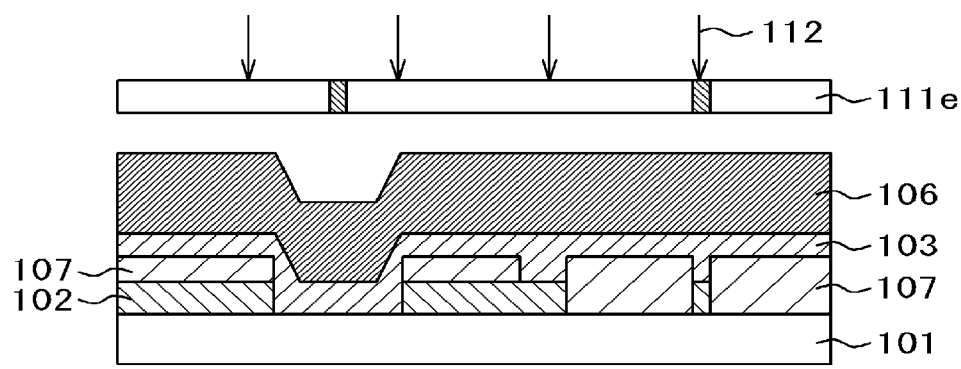
FIG. 11O is a schematic cross sectional view for explaining the manufacturing process of the liquid crystal display device of the second embodiment of the present invention (application of an SOC film and UV radiation using a photoresist mask for the SOC film)
Figure 11P:
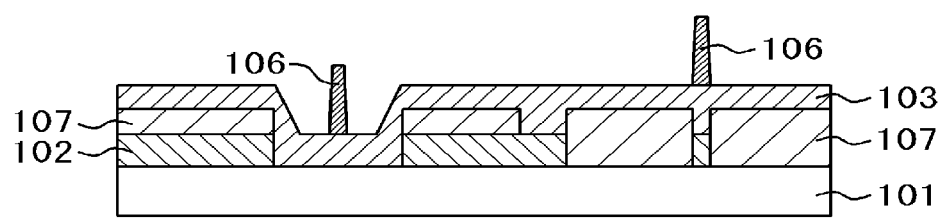
FIG. 11P is a schematic cross sectional view for explaining the manufacturing process of the liquid crystal display device of the second embodiment of the present invention (removal of an unnecessary SOC film: formation of a wall and a columnar spacer)

Next, an overcoat (OC) is applied to form the OC 103 of 2 μm (FIG. 11N). Subsequently, a SOC (Space On Color filter) resist is applied on the Overcoat to form a SOC resist film of 3 μm, and the UV radiation 112 is applied using a photomask 111e for the SOC resist film (FIG. 11O). Then, the excessive SOC resist film is removed to form the SOC resist film 106 having a desired pattern (FIG. 11P). In this case, a column 106 that defines the distance between the TFT substrate and CF substrate is formed in the available display area (right-hand side of the figure), and the wall 106 that inhibits the expansion of the alignment film is formed in the frame (left-hand side of the figure). Although only one column 106 is described in this figure, multiple columns are formed in fact.

Figure 11Q:
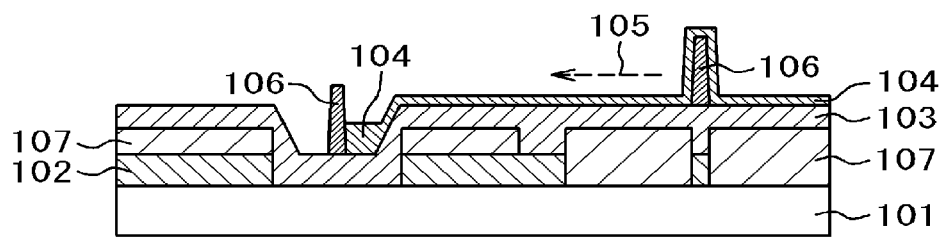
FIG. 11Q is a schematic cross sectional view for explaining the manufacturing process of the liquid crystal display device of the second embodiment of the present invention (application of an alignment film)
Figure 11R:
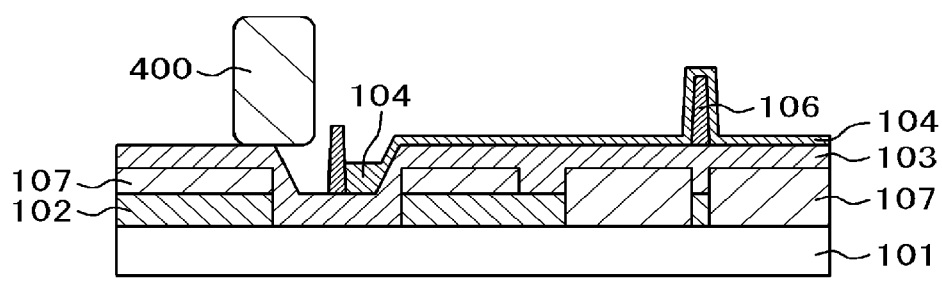
FIG. 11R is a schematic cross sectional view for explaining the manufacturing process of the liquid crystal display device of the second embodiment of the present invention (application of a sealant)
Figure 11S:
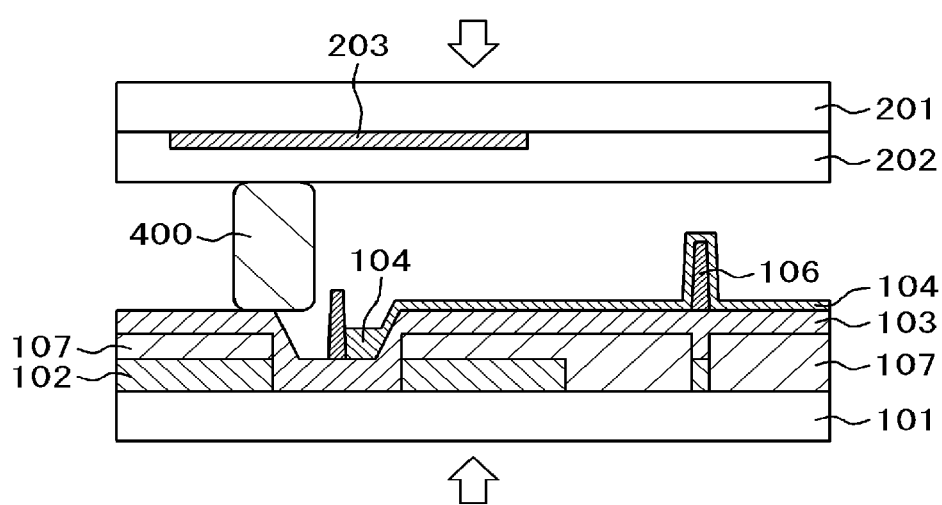
FIG. 11S is a schematic cross sectional view for explaining the manufacturing process of the liquid crystal display device of the second embodiment of the present invention (bonding of the CF substrate and TFT substrate)

Next, the alignment film is applied to the available display area. Part of this alignment film expands from the available display area to the frame, enters the concave portion formed by removing the BM 102 and color resist film 107, and is stopped by the wall 106 of the SOC resist film formed in the concave portion (FIG. 11Q). The thickness of the alignment film is about 0.1 μm. Subsequently, the seal 400 that seals the liquid crystal is applied to a predetermined portion of the frame (FIG. 11R). Then, this substrate (CF substrate) and a separately manufactured TFT substrate having the film stack 202 of 10 μm are laminated (FIG. 11S) and bonded to one another to achieve the structure of the liquid crystal display device shown in FIG. 5A (FIG. 11T). The concave (slot) portion of the wall area where the black matrix and the color resist film are partially removed is usable as a pool for the alignment film to improve the effect of stopping the alignment film. In FIGS. 11S and 11T, unlike in FIG. 5A, the upper and lower substrates are reversed, in which the upper portion is the TFT substrate and the lower portion is the CF substrate. The light shielding metal film 203 is 70 μm in width to cover the area (50 μm in width) where the BM 102 has been removed. Since the light shielding metal film provided to the TFT substrate can be formed in time with formation of the gate electrode, there is no increase in the process number.

When the liquid crystal display device 100 shown in FIG. 1 is produced using the above manufacturing method, color unevenness in the peripheral liquid crystal display device area does not occur.

As mentioned above, according to this embodiment, it may be possible to provide a liquid crystal display device in which color unevenness in the peripheral display area can be reduced and inhibited even the liquid crystal display device has a narrow frame. The removal of the Overcoat not contained in the normal manufacturing process is not contained. In the machining process contained in the normal manufacturing process, BM and the color resist film are removed in the portion where the wall of the SOC resist film is formed. Without increase of the manufacturing process, the distance between the wall 106 and TFT substrate can be expanded. Although the wall is formed simultaneously with the SOC in this embodiment, two SOCs having different heights (a main SOC and a sub SOC lower than the main SOC in height) may be formed depending on a display device. In this case, when the wall is formed using the sub SOC, the seal gets over the wall easier.

Second Embodiment

Figure 6A:
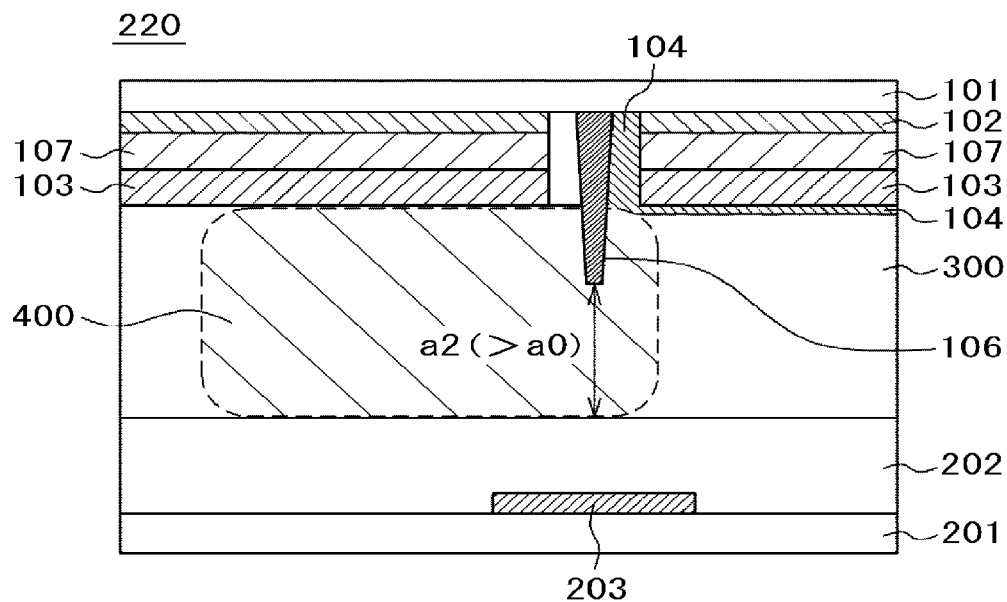
FIG. 6A is a schematic cross sectional view of the frame portion in the liquid crystal display device of the second embodiment of the present invention.
Figure 6B:
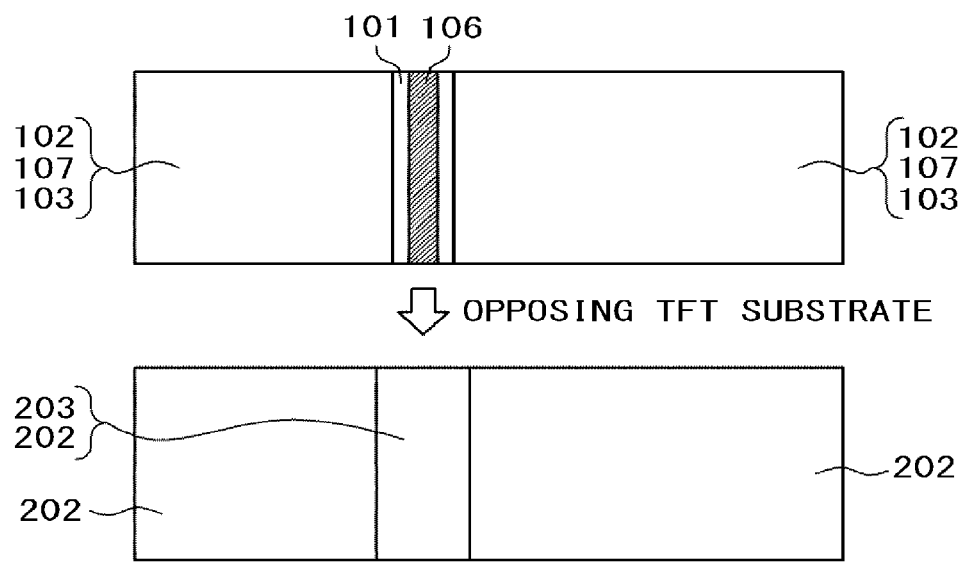
FIG. 6B is a schematic plan view of the liquid crystal display device of the second embodiment of the present invention, in which the upper portion is the CF substrate and the lower portion is the TFT substrate.

The second embodiment of the present invention is described using FIGS. 6A and 6B. Unless otherwise indicated, the subject matters described in embodiment 1 but not described in this embodiment are applicable in this embodiment. FIG. 6A is a schematic cross sectional view of a frame portion in the liquid crystal display device of this embodiment. FIG. 6B is a schematic plan view of the liquid crystal display device of this embodiment, in which the upper portion is the CF substrate, and the lower portion is the TFT substrate.

In this embodiment, to make a distance a2 between the wall 106 that stops the expansion of the alignment film 104 and the topmost surface of the TFT substrate larger than the distance a0 shown in FIG. 2, the black matrix (BM) 102, the color resist film 107, and the overcoat (OC) 103 on the CF substrate are removed in the area where the wall 106 is formed. Thus, the distance a2 is ensured wider than the distance a0 by the total thickness of the BM 102, the color resist film 107, and the OC 103. Therefore, the seal 400 expands over the wall 106 easier than in the structure shown in the embodiment 1, and variation of the distance between the TFT substrate and CF substrate can be reduced. Consequently, the generation of the color unevenness in the peripheral display area can be inhibited. Additionally, the alignment film 104 is stopped by the wall 106 and can be inhibited from expanding. As a result, the reliability life is securable. However, in this embodiment, since the BM 102 is removed, light dropout may occur. As a countermeasure against the light dropout, the light shielding metal film 203 may be disposed to the TFT substrate, for example.

Following the manufacturing method shown in FIGS. 11A to 11T, the liquid crystal display device 100 shown in FIG. 1 is produced. The difference of this embodiment from embodiment 1 in the manufacturing method is that the process of removing the overcoat in the area where the wall 106 of the SOC resist film is formed is added. As a result of evaluating this liquid crystal display device, color unevenness in the peripheral liquid crystal display device area does not occur.

As mentioned above, according to this embodiment, it may be possible to provide a liquid crystal display device in which color unevenness can be reduced and inhibited in the peripheral display area even when the display has a narrow frame. In the area to form the wall 106 of the SOC resist film, since the Overcoat in addition to the black matrix and color resist film is removed, the distance between the wall and the TFT film (insulating layer) of the TFT substrate can be made longer than in the structure shown in embodiment 1.

Third Embodiment

Figure 7A:
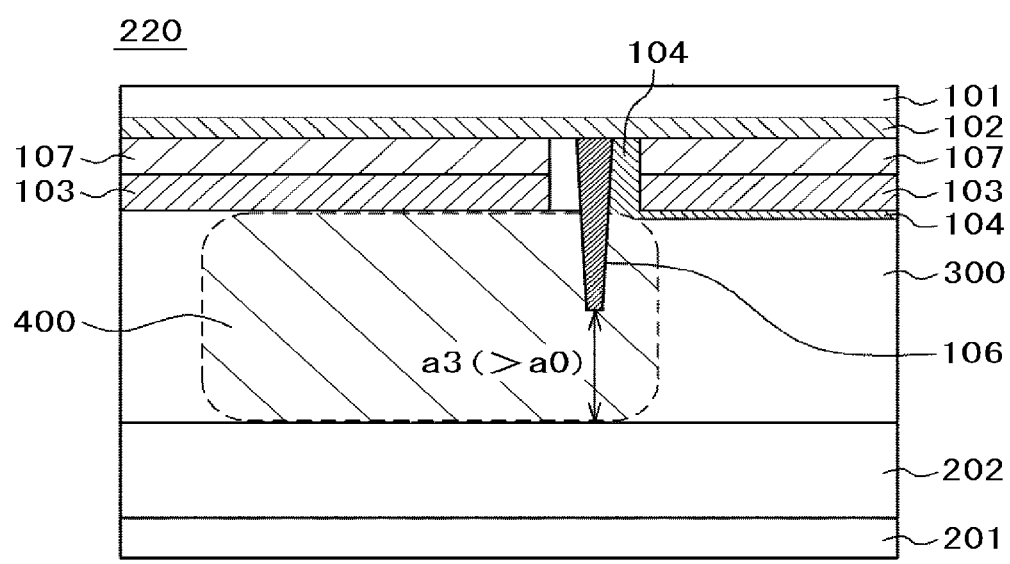
FIG. 7A is a schematic cross sectional view of the frame portion in the liquid crystal display device of the third embodiment of the present invention.
Figure 7B:
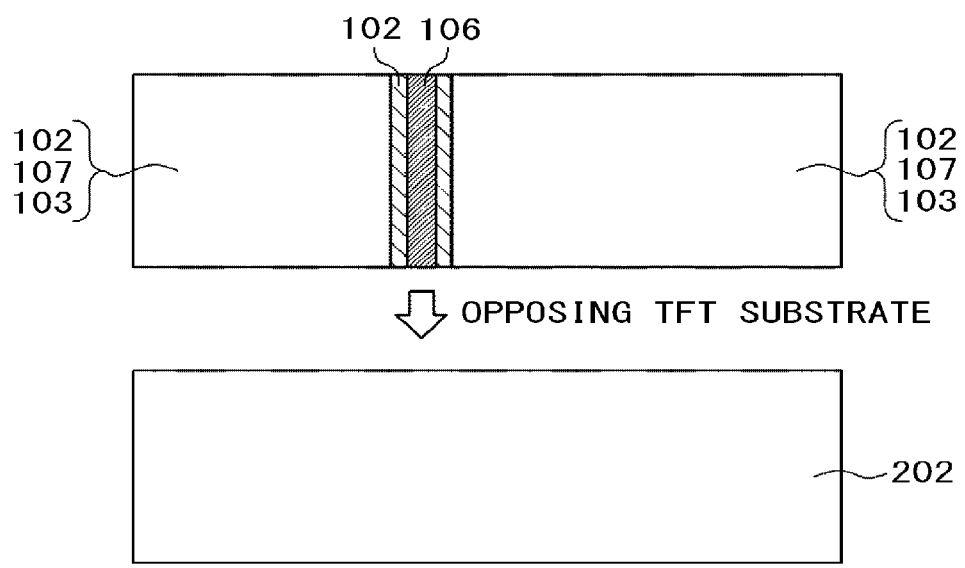
FIG. 7B is a schematic plan view of the liquid crystal display device of the third embodiment of the present invention, in which the upper portion is the CF substrate and the lower portion is the TFT substrate.

The third embodiment of the present invention is described using FIGS. 7A and 7B. Unless otherwise indicated, the subject matters described in embodiment 1 but not described in this embodiment are applicable to this embodiment. FIG. 7A is a schematic cross sectional view of a frame portion in the liquid crystal display device of this embodiment. FIG. 7B is a schematic plan view of the liquid crystal display device of this embodiment, in which the upper portion is the CF substrate, and the lower portion is the TFT substrate.

In this embodiment, to make a distance a3 between the wall 106 that stops the expansion of the alignment film 104 and the topmost surface of the TFT substrate larger than the a0 shown in FIG. 2, the color resist film 107 and the overcoat (OC) 103 on the CF substrate are removed in the area where the wall 106 is formed. Therefore, the distance a3 can be ensured wider than the distance a0 by the total thickness of the color resist film 107 and the OC 103. The seal 400 expands over the wall 106 easier than in the structure shown in the embodiment 1, and variation of the distance between the TFT substrate and CF substrate can be reduced. As a result, the generation of the color unevenness in the peripheral display area can be inhibited. The alignment film 104 is stopped by the wall 106 and can be inhibited from expanding. Therefore, the reliability life is securable. In this embodiment, since the BM 102 is not removed, a countermeasure against light dropout is unnecessary.

Following the manufacturing method shown in FIGS. 11A to 11T, the liquid crystal display device 100 shown in FIG. 1 is produced. The difference of this embodiment from embodiment 2 in the manufacturing method is that the process of removing the black matrix in the area where the wall 106 of the SOC resist film is formed is unnecessary. As a result of evaluating this liquid crystal display device, color unevenness in the peripheral liquid crystal display device area does not occur.

As mentioned above, according to this embodiment, it may be possible to provide a liquid crystal display device in which color unevenness in the peripheral display area can be reduced and inhibited even when the liquid crystal display device has a narrow frame. In the area to form the wall 106 of the SOC resist film, since the black matrix is not removed, a countermeasure against the light dropout is unnecessary.

Fourth Embodiment

Figure 8A:
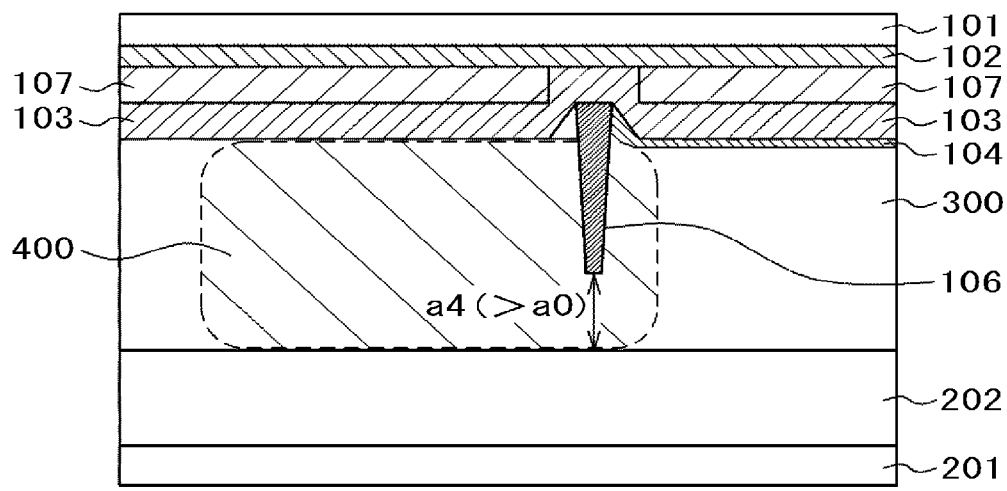
FIG. 8A is a schematic cross sectional view of the frame portion in the liquid crystal display device of the fourth embodiment of the present invention.
Figure 8B:
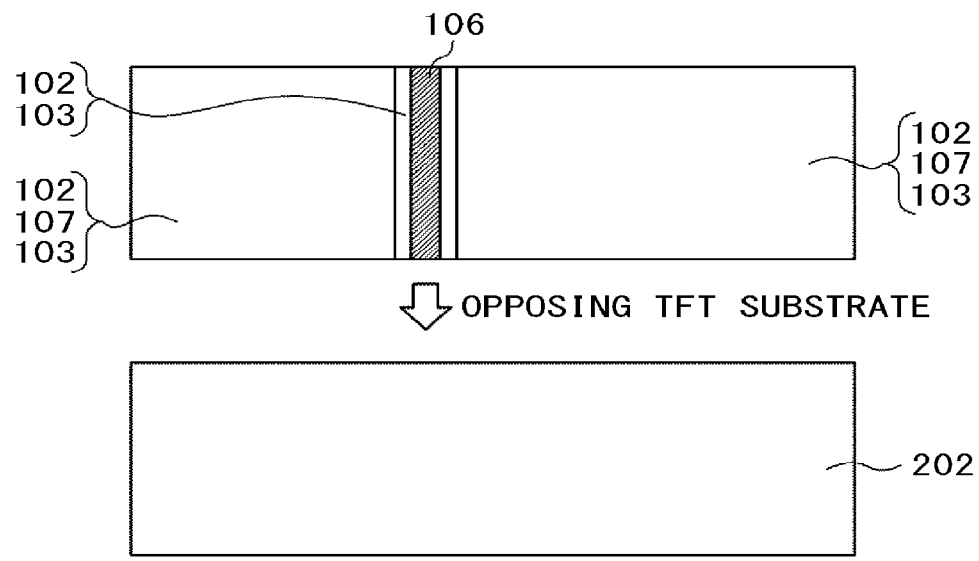
FIG. 8B is a schematic plan view of the liquid crystal display device of the fourth embodiment of the present invention, in which the upper portion is the CF substrate and the lower portion is the TFT substrate.

The fourth embodiment of the present invention is described using FIGS. 8A and 8B. Unless otherwise indicated, the subject matters described in the embodiment 1 but not described in this embodiment are also applicable to this embodiment. FIG. 8A is a schematic cross sectional view of a frame portion in the liquid crystal display device of this embodiment. FIG. 8B is a schematic plan view of the liquid crystal display device of this embodiment, in which the upper portion is the CF substrate, and the lower portion is the TFT substrate.

In this embodiment, to make a distance a4 between the wall 106 that stops the expansion of the alignment film 104 and the topmost surface of the TFT substrate longer than the a0 shown in FIG. 2, the color resist film 107 on the CF substrate is removed in the area where the wall 106 is formed. Consequently, the distance a4 is ensured wider than the distance a0 by the thickness of the color resist film 107. Therefore, the seal 400 expands easily over the wall 106, and variation of the distance between the TFT substrate and the CF substrate can be reduced. Accordingly, the generation of the color unevenness in the peripheral display area can be inhibited. The alignment film 104 is stopped by the wall 106 and can be inhibited from expanding. As a result, the reliability life is securable. Since the color resist film 107 is processed and then used in the available display area, the removal of this film in the wall portion of the frame can be performed without increasing the process number. In this embodiment, since the BM 102 is not removed, light dropout does not occur and a countermeasure against the light dropout is unnecessary.

Following the manufacturing method shown in FIGS. 11A to 11T, the liquid crystal display device 100 shown in FIG. 1 is produced. The difference of this embodiment from embodiment 1 in the manufacturing method is that the process of removing the black matrix in the area where the wall 106 of the SOC resist film is formed is unnecessary. As a result of evaluating this liquid crystal display device, color unevenness in the peripheral liquid crystal display device area does not occur.

As mentioned above, according to this embodiment, it may be possible to provide a liquid crystal display device in which the color unevenness in the peripheral display area can be reduced and inhibited even when the liquid crystal display device has a narrow frame. Removal of the Overcoat not contained in the normal manufacturing process is not contained. The color resist film in the portion where the wall of the SOC resist film is formed is removed in the machining process contained in the normal manufacturing process. As a result, the distance between the wall 106 and the TFT substrate can be expanded without increasing the manufacturing process number. In the area to form the wall 106 of the SOC resist film, since the black matrix is not removed, a countermeasure against light dropout is unnecessary.

Fifth Embodiment

Figure 9A:
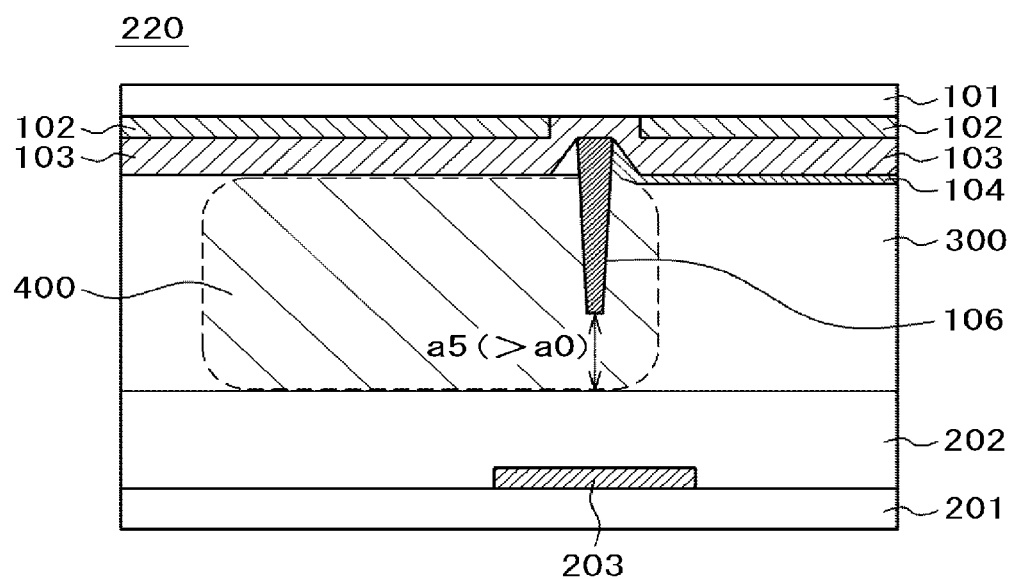
FIG. 9A is a schematic cross sectional view of the frame portion in the liquid crystal display device of the fifth embodiment of the present invention.
Figure 9B:
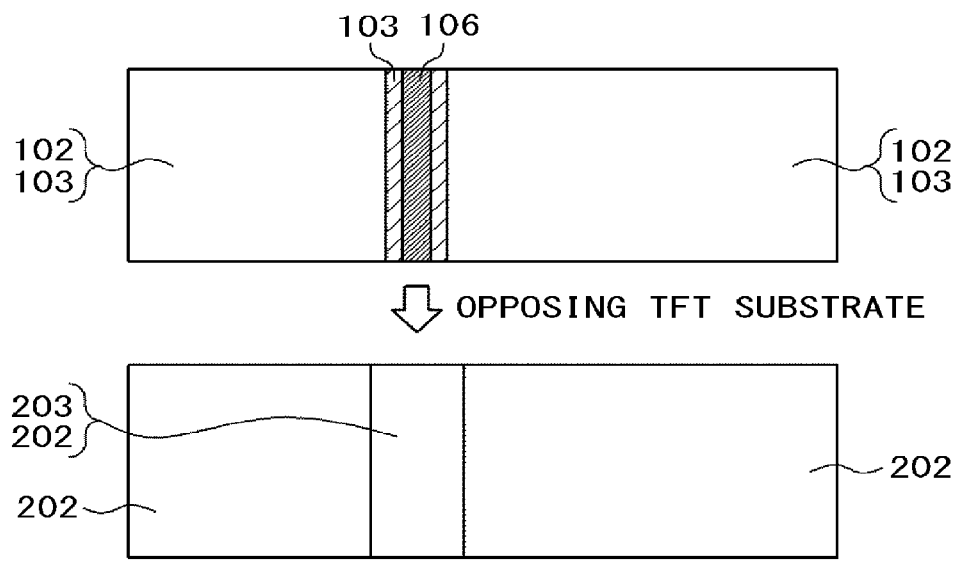
FIG. 9B is a schematic plan view of the liquid crystal display device of the fifth embodiment of the present invention, in which the upper portion is the CF substrate and the lower portion is the TFT substrate.

The fifth embodiment of the present invention is described using FIGS. 9A and 9B. Unless otherwise indicated, the subject matters described in embodiment 1 but not described in this embodiment are also applicable to this embodiment. FIG. 9A is a schematic cross sectional view of the frame portion in the liquid crystal display device of this embodiment. FIG. 9B is a schematic plan view of the liquid crystal display device of this embodiment, in which the upper portion is the CF substrate, and the lower portion is the TFT substrate. In this embodiment, no color resist film is provided to the frame.

In this embodiment, to make a distance a5 between the wall 106 that stops the expansion of the alignment film 104 and the topmost surface of the TFT substrate larger than the a0 shown in FIG. 2 (the case where there is no color resist film in FIG. 2 is assumed), the black matrix (BM) 102 on the CF substrate is removed in the area where the wall 106 is formed. The distance a5 can be ensured wider than the distance a0 by the thickness of the BM 102. Accordingly, the seal 400 expands easily over the wall 106, and variation of the distance between the TFT substrate and the CF substrate can be reduced. Consequently, the generation of the color unevenness in the peripheral display area can be inhibited. The alignment film 104 is stopped by the wall 106 and can be inhibited from expanding. As a result, the reliability life is securable. Since the BM 102 is processed and then used in the available display area, the removal of this film in the wall portion of the frame can be performed without increasing the process number. However, in this embodiment, since the BM 102 is removed, light dropout may occur. As a countermeasure against the light dropout, the light shielding metal film 203 may be disposed to the TFT substrate, for example.

Following the manufacturing method shown in FIGS. 11A to 11T, the liquid crystal display device 100 shown in FIG. 1 is produced. The difference of this embodiment from embodiment 1 in the manufacturing method is that no color resist film is left in the frame. As a result of evaluating this liquid crystal display device, the color unevenness in the peripheral liquid crystal display device area does not occur.

As mentioned above, according to this embodiment, it may be possible to provide a liquid crystal display device in which color unevenness in the peripheral display area can be reduced and inhibited even when the display device has a narrow frame. The removal of the Overcoat not contained in the normal manufacturing process is not contained. The black matrix in the portion where the wall of the SOC resist film is formed is removed in the machining process contained in the normal manufacturing process. The distance between the wall 106 and the TFT substrate can be expanded without increasing the manufacturing process.

Sixth Embodiment

Figure 10A:
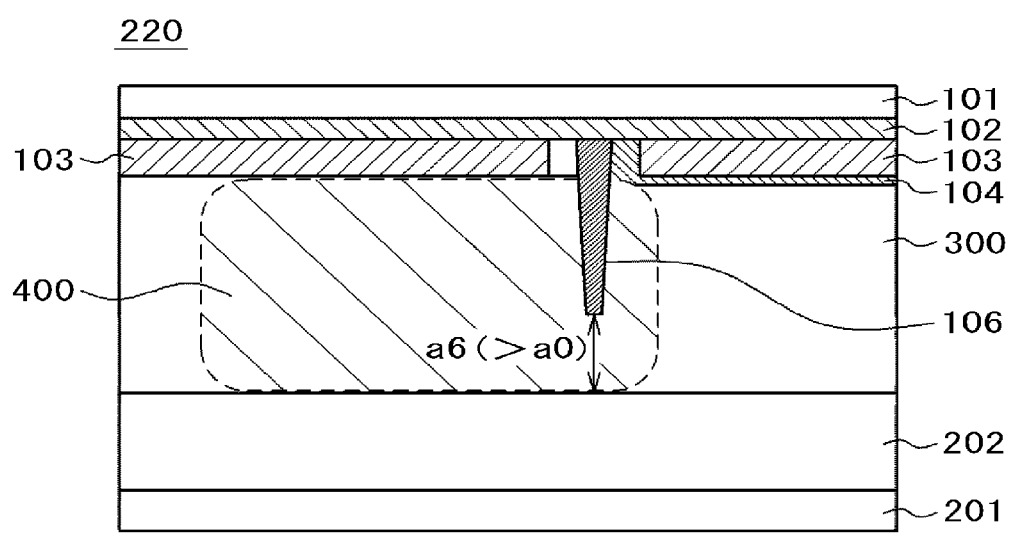
FIG. 10A is a schematic cross sectional view of the frame portion in the liquid crystal display device of the sixth embodiment of the present invention.
Figure 10B:
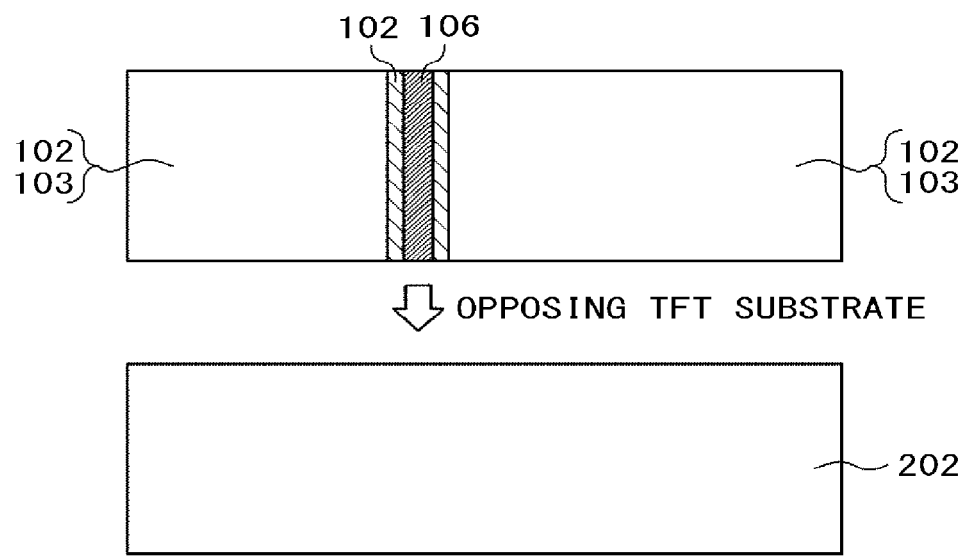
FIG. 10B is a schematic plan view in the liquid crystal display device of the sixth embodiment of the present invention, in which the upper portion is the CF substrate and the lower portion is the TFT substrate.

The sixth embodiment of the present invention is described using FIGS. 10A and 10B. Unless otherwise indicated, the subject matters described in embodiment 1 but not described in this embodiment are applicable to this embodiment. FIG. 10A is a schematic cross sectional view of a frame portion in the liquid crystal display device of this embodiment. FIG. 10B is a schematic plan view of the liquid crystal display device of this embodiment, in which the upper portion is the CF substrate, and the lower portion is the TFT substrate. This embodiment shows the case where there is no color resist film in the frame.

In this embodiment, to make a distance a6 between the wall 106 that stops the expansion of the alignment film 104 and the topmost surface of the TFT substrate larger than the a0 shown in FIG. 2 (the case where there is no color resist film in FIG. 2 is assumed), the overcoat (OC) 103 on the CF substrate is removed in the area where the wall 106 is formed. Therefore, the distance a6 is ensured wider than the distance a0 by the thickness of the OC 103. Therefore, the seal 400 expands easily over the wall 106, and variation of the distance between the TFT substrate and CF substrate can be reduced. As a result, the generation of the color unevenness in the peripheral display area can be inhibited. Additionally, the alignment film 104 is stopped by the wall 106 and can be inhibited from expanding. As a result, the reliability life is securable.

Following the manufacturing method shown in FIGS. 11A to 11T, the liquid crystal display device 100 shown in FIG. 1 is produced. The difference of this embodiment from embodiment 5 in the manufacturing method is that the black matrix 102 on the CF substrate is not removed but the OC 103 is removed in the area where the wall 106 is formed. As a result of evaluating this liquid crystal display device, the color unevenness in the peripheral liquid crystal display device area does not occur.

As mentioned above, according to this embodiment, it may be possible to provide a liquid crystal display device in which the color unevenness in the peripheral display area can be reduced and inhibited even when the liquid crystal display device has a narrow frame. In the area to form the wall 106 of the SOC resist film, since the black matrix is not removed, a countermeasure against light dropout is unnecessary.

The present invention is not limited to the above embodiments but includes various modifications. For example, even when the color filter is formed to the TFT substrate, the present invention is achievable by removing the black matrix and Overcoat. Additionally, it may be possible that, in the structure where no SOC is provided to the CF substrate and a spacer is formed to the TFT substrate, the wall be formed simultaneously with the spacer of the TFT substrate. In that case, it may be also possible to remove part of a film formed to the TFT substrate in the portion where the wall is formed. Of course, a film of the counter substrate facing the wall may be removed. Of course, an advantageous effect of the present invention is obtainable by removing some film of the TFT substrate facing the wall even when the wall is formed to the CF substrate. The wall is provided having a shape to block the overall periphery of the display area. No wall may be provided to the portion having a margin in the frame, such as the terminal portion 230 of FIG. 1. Additionally, the above embodiments describe liquid crystal display devices. Also in an organic electroluminescent display device, to achieve vapor proof, integration with a touch panel, etc., a substrate facing a TFT substrate in which organic electroluminescent elements are formed may be provided, and the TFT substrate and counter substrate may be adhered to one another by sealing. The present invention is applicable to an organic electroluminescent display device having such a structure. In that case, the color filter of the present invention can correspond to any organic electroluminescent display device using a color filter. The present invention is also applicable to organic electroluminescent display devices using other organic films and inorganic films. The above embodiments have been explained in detail for easy understanding of the present invention. The embodiments are not limited to ones having all the explained structures. Part of the structure of one embodiment is replaceable with the structure of another embodiment. The structure of another embodiment can be added to that of one embodiment. Part of the structure of each embodiment can be deleted, or added to or replaced with the structure of another embodiment.

As mentioned above, the present invention has been explained in detail, but also includes the following embodiments of the invention.

(1) In a display device having an available display area and a frame portion surrounding the available display area, a first substrate, a second substrate, and a seal that seals between the first substrate and the second substrate are disposed in the frame portion, the second substrate has a wall over which the seal is disposed, and the distance from the second substrate in the area where the wall is formed to the surface of the first substrate facing the area where the wall is formed is larger than the distance from the periphery of the area where the wall is formed.

(2) In a display device having an available display area and a frame portion surrounding the available display area, a first substrate, a second substrate, and a seal that seals between the first substrate and the second substrate are disposed in the frame portion, the second substrate has a wall over which the seal is disposed, the height of the wall is lower than the heights of multiple columns that are formed in the available display area and that define the distance between the first substrate and the second substrate, and the distance from the wall to the first substrate is increased in accordance with the lowness of the wall relative to the multiple columns.

(3) In a display device having an available display area and a frame portion surrounding the available display area, a first substrate, a second substrate, and liquid crystal sandwiched between the first substrate and the second substrate and sealed by a seal are disposed in the frame portion, the second substrate has an alignment film and a wall that inhibits the alignment film from expanding outwardly toward the available display area, the seal is disposed over the wall, and the distance from the second substrate in the area where the wall is formed to the surface of the first substrate facing the area where the wall is formed is larger than the distance from the periphery of the area where the wall is formed.

(4) In a display device having an available display area and a frame portion surrounding the available display area, a first substrate, a second substrate, and liquid crystal sandwiched between the first substrate and the second substrate and sealed by a seal are disposed in the frame portion, the second substrate has an alignment film and a wall that inhibits the alignment film from expanding outwardly toward the available display area, the seal is disposed over the wall, the height of the wall is lower than the heights of multiple columns that are formed in the available display area and that define the distance between the first substrate and second substrate, and the distance from the wall to the first substrate is made wider in accordance with the lowness of the wall relative to the multiple columns.

What is claimed is:

1. A liquid crystal display device, comprising:
   a first substrate,
   a second substrate,
   a liquid crystal sandwiched between the first substrate and the second substrate,
   a seal portion for sealing the liquid crystal,
   wherein the second substrate has a black matrix (BM), a color resist layer, an overcoat (OC) layer and an alignment film,
   a wall formed on a region where the sealing portion is formed on the second substrate, and the BM, the color resist layer, and the OC layer are formed on the region, and
   the BM is removed at a place where the wall is formed on the region,
   the first substrate has a light shielding metal film formed on a position opposite to the place where the BM is removed.

2. The liquid crystal display device according to claim 1, wherein further, the color resist layer is removed in the second substrate.

3. The liquid crystal display device according to claim 1, wherein further, the color resist layer and the OC layer are removed in the second substrate.

4. The liquid crystal display device according to claim 1, wherein the removed layers of the second substrate are the color resist layer and the OC layer.

5. A liquid crystal display device, comprising:
   a first substrate,
   a second substrate,
   a liquid crystal sandwiched between the first substrate and the second substrate,
   a sealing portion for sealing the liquid crystal,
   wherein the second substrate has a black matrix (BM), an overcoat (OC) layer and an alignment film,
   a wall formed on a region where the sealing portion is formed on the second substrate, and the BM and the OC layer are formed on the region, and
   the BM is removed at a place where the wall is formed on the region,
   the first substrate has a light shielding metal film formed on a position opposite to the place where the BM is removed.

6. The liquid crystal display device according to claim 5, wherein the removed layer of the second substrate is the OC layer.

* * * * *